United States Patent [19]

Greenberg et al.

[11] Patent Number: 5,042,949

[45] Date of Patent: Aug. 27, 1991

[54] OPTICAL PROFILER FOR FILMS AND SUBSTRATES

[76] Inventors: Jeffrey S. Greenberg, 5 Miramar Ave., Santa Barbara, Calif. 93108; Jay E. Robinson, 1545 Kendall Dr., Boulder, Colo. 80303; James M. Young, P.O. Box 40449, Santa Barbara, Calif. 93140; Daniel A. Cohen, 309-B Consuelo Dr., Santa Barbara, Calif. 93110

[21] Appl. No.: 325,378

[22] Filed: Mar. 17, 1989

[51] Int. Cl.$^5$ .............................................. G01B 9/02
[52] U.S. Cl. ................... 356/345; 356/359; 356/361; 356/376; 356/382
[58] Field of Search ............... 356/345, 356, 358, 359, 356/360, 368, 381, 382, 445, 376, 361

[56] References Cited

U.S. PATENT DOCUMENTS

| | | |
|---|---|---|
| 3,127,465 | 3/1964 | Stephens . |
| 3,527,537 | 9/1970 | Hobrough . |
| 3,694,088 | 9/1972 | Gallagher et al. . |
| 3,796,495 | 3/1974 | Laub . |
| 4,025,195 | 5/1977 | Ebersole et al. . |
| 4,225,240 | 9/1980 | Balasubramanian . |
| 4,373,817 | 2/1983 | Coates . |
| 4,521,686 | 4/1985 | Coates et al. . |
| 4,576,479 | 3/1986 | Downs . |
| 4,600,832 | 7/1986 | Grund . |
| 4,639,139 | 1/1987 | Wyant et al. . |
| 4,676,647 | 6/1987 | Kikkawa et al. .................... 356/382 |
| 4,687,333 | 8/1987 | Odasima et al. .................... 356/382 |
| 4,818,110 | 4/1989 | Davidson . |
| 4,845,356 | 7/1989 | Baker .................................. 356/368 |

FOREIGN PATENT DOCUMENTS 2109545A 7/1984 United Kingdom .

OTHER PUBLICATIONS

K. Creath, "Comparison of Phase-Management Algorithms" S.P.I.E., vol. 680; Surface Characterization and Testing, 19-28 (1986).
Nanospec/AFT Automatic Film Thickness Gauge; Nanometrics, Inc. (Product Brochure).
J. C. Wyant, "Use of an A.C. Heterodyne Lateral Shear Interferometer with Real-Time Wavefront Correction Systems," Applied Optics, vol. 14, No. 11, pp. 2622-2626 (Nov. 1975).
M. Davidson, K. Kaufman and I. Mazor, "The Coherence Probe Microscope," Solid State Technology, pp. 57-59 (Sep. 1987).
J. C. Wyant et al., "An Optical Profilometer for Surface Characterization of Magnetic Media": ASLE, Preprint No. 83-AM-6A-1; (Apr. 24-28, 1983).
Davidson et al., "An Application of Interference Microscopy to Integrated Circuit Inspection and Metrology," SPIE-Microlithography Conference Pr. (Mar. 1987).
Cheng and Wyant, "Two-Wavelength Phase Shifting Interferometry," Applied Optics, vol. 23, No. 24 (Dec. 15, 1984).
WYKO Topo TM Product Brochure.

Primary Examiner—Samuel Turner
Attorney, Agent, or Firm—Morgan & Finnegan

[57] ABSTRACT

An optical non-contact surface profiler for determining (i) the surface profile of a transparent layer on a light-absorbing or opaque substrate, (ii) the surface profile of a light-absorbing or opaque substrate through a transparent layer, and (iii) the thickness profile of a transparent layer on a light-absorbing or opaque surface. A microscope alternatively configured in interferometric mode and in spectrophotometric mode provides phase data from an interference pattern and reflectance data from a reflectance pattern, respectively. A photo-sensing device receives the interference patterns and reflectance patterns and inputs the corresponding phase data and reflectance data to a computing device. The computing device processes the data to determine the appropriate surface or film thickness profiles.

11 Claims, 5 Drawing Sheets

STEP OF TRANSPARENT FILM ON TOP OF OPAQUE SUBSTRATE

SURFACE PROFILE OF OPAQUE MATERIAL THROUGH TRANSPARENT FILM WITH TRANSPARENT FILM INDEX TOO LOW

SURFACE PROFILE OF OPAQUE MATERIAL THROUGH TRANSPARENT FILM WITH TRANSPARENT FILM INDEX TOO HIGH

SURFACE PROFILE OF OPAQUE MATERIAL THROUGH TRANSPARENT FILM WITH THE CORRECT TRANSPARENT FILM INDEX

OPTICAL PROFILER FOR FILMS AND SUBSTRATES

FIELD OF INVENTION

This invention relates to an optical surface profiler. More particularly, this invention relates to an optical non-contact surface profiler capable of (i) surface profiles of transparent layers on light-absorbing surfaces, (ii) surface profiles of light-absorbing surfaces through transparent layers, (iii) thickness profiles of transparent layers on light-absorbing surfaces, and (iv) surface profiles of light-absorbing surfaces.

BACKGROUND

With the increasing competition in the semiconductor industry and the expense of producing integrated circuit devices, there is a need for quality assurance equipment to identify defective substrates as early in the fabrication process as possible. Surface profile equipment capable of resolving at a microscopic precision have been adapted for performing such quality assurance.

There are optical surface profilers available capable of measuring the surface profile of an opaque substrate. There also are spectrophotometric and ellipsometric devices available capable of measuring the thickness of a transparent layer on an opaque substrate at a single position on the sample. However, because the integrated circuit fabrication process includes adding layers of transparent film to light-absorbing or opaque substrates, there also is a need for an apparatus capable of measuring the surface profile of a transparent film on a light-absorbing or opaque substrate. Similarly, there is a need for an apparatus capable of measuring the subsurface profile of light-absorbing or opaque material through the transparent layer. Similarly there is a need to measure the film thickness profile of a transparent film on a light-absorbing or opaque substrate.

SUMMARY OF THE INVENTION

It is an object of the invention to provide an optical profiler for (i) determining the surface profile of a transparent layer on a light-absorbing or opaque substrate and (ii) determining the sub-surface profile of a light-absorbing or opaque surface through a transparent layer.

It is another object of the invention to provide an optical profiler for determining the thickness profile of a transparent layer on a light-absorbing or opaque substrate.

It is another object of this invention to provide a method for determining the index of refraction of a transparent layer on a light-absorbing or opaque substrate.

Briefly, a preferred embodiment of the present invention includes a specially configured Linnik microscope with several interchangeable narrowband spectral filters in the illumination path in combination with a photosensing array and a computer.

By alternatively configuring the microscope of the profiler in interferometric mode (Linnik reference channel unshuttered) and spectrophotometric mode (Linnik reference channel shuttered), the profiler gathers phase data from an interference pattern and reflectance data from a reflectance pattern, respectively. Such data is used to determine the surface profile of a transparent layer on a light-absorbing or opaque substrate and the sub-surface profile of a light-absorbing or opaque substrate through a transparent layer.

The phase data and reflectance data contains information about the surface of the transparent layer, the layer thickness, and the surface of the substrate. To extract the surface profile of the transparent layer from the interference pattern, a correction is required for each point in the profile which removes the contribution to the phase due to the transparent layer thickness.

The phase correction value is calculated for each point of the profile from a film thickness profile and the optical properties of the film and the substrate. The film thickness profile is calculated from the reflectance data. The surface profile of the transparent layer is then calculated by subtracting the phase correction value from the phase data and then converting the corrected phase information into a surface profile.

The sub-surface profile of the light-absorbing material beneath the transparent layer is found by subtracting the film thickness profile from the surface profile.

DETAILED DESCRIPTION OF A PREFERRED EMBODIMENT

Figure 1:
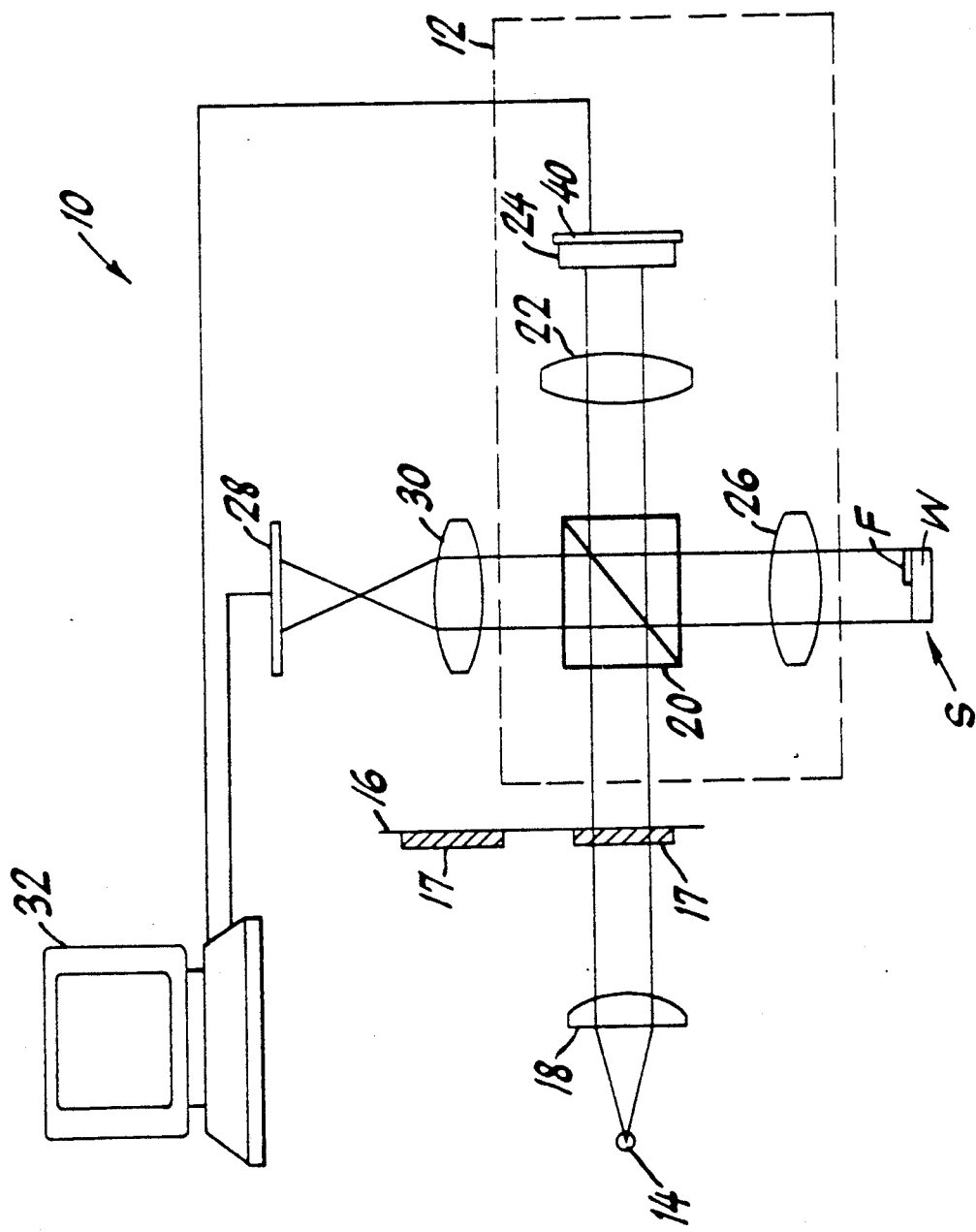
FIG. 1 is a schematic of the non-contact surface profiler including a Linnik interferometric objective.

Referring to FIG. 1, the non-contact surface profiler includes a microscope equipped with a dual beam interferometric objective attachment 12. Although a Linnik interferometric attachment 12 is preferred, other interferometric attachments might be used.

The profiler using the Linnik attachment 12 includes a light source 14 and a filter wheel 16. The filter wheel 16 includes spectral filters 17 each of which is transparent to a particular wavelength of light and is opaque to all other wavelengths. Light emitted from the light source 14 passes through a collimating lens 18, then through the selected filter 17 on the filter wheel 16. By rotating the wheel 16, the different spectral filters are interchanged so that light of a selected wavelength passes through the filter.

The light passing through the filter 17 is incident upon a beamsplitter 20 which divides the incident light. A portion of the light is transmitted through the beamsplitter 20 and focused by a reference objective lens 22 onto a reference mirror 24. The light then reflects off the reference mirror 24, passes back through the reference objective lens 22 and returns to the beamsplitter 20.

The other half of the light beam is reflected by the beamsplitter 20 (instead of being transmitted) and is focussed by a sample objective lens 26 onto the sample S to be profiled.

The sample may, for example, be an intergrated circuit layer F on a semiconductor wafer W at an intermediate stage of the fabrication process. The light reflects off the sample S, passes back through the sample objective lens 26 and returns to the beamsplitter 20.

The beams returning from the sample and the reference mirror recombine and interfere at the beamsplitter 20. Images are formed of the interference pattern of the reference mirror surface and the sample surface by a lens 30 at a photo sensing device 28. Alternatively the reference channel 22, 24 may be shuttered so that the lens 30 forms only the image of the sample surface at the photosensing device 28.

The photo sensing device 28 is a solid state photodetector array linked to a computer 32 via a multi-bit A/D converter (not shown) which preferably has 12 bit or greater precision. The computer 32 processes the data from the photosensing device and additionally may format and display raw or processed data in various formats. (i.e. FIG. 5).

The FIG. 1 embodiment with the Linnik interferometer is the preferred embodiment. The Linnik geometry easily allows the use of high magnification microscope objectives. Additionally, the reference channel of the Linnik 12 may be shuttered easily to allow the profiler to be used in two modes. The profiler can be used to obtain interferometric data (reference portion unshuttered) or to obtain standard microscope image reflectance data (reference portion shuttered). Other possible embodiments include the Mireau or Michelson interferometric objectives and/or a rotatable grating in the illumination path instead of spectral filters.

Measuring Surface Profiles

For applications where the sample consists only of an opaque material, multi-wavelength phase measuring interferometry (MWPMI) techniques may be used to determine a surface profile. If the sample consists of a thin transparent layer over an opaque substrate then MWPMI is used in combination with imaging spectrophotometry to determine the surface profile. By using the profiler of FIG. 1 with the reference portion unshuttered, the light incident on the photosensing device 28 forms an interference pattern from the light reflected from the sample S and the light reflected from the reference mirror 24. By rotating the filter wheel 16, interference patterns are obtained for different illumination wavelengths.

The interference pattern that is formed represents the phase difference between the two interfering wavefronts. By using phase measuring interferometry (PMI) techniques, this phase difference may be determined very accurately.

To perform PMI requires that the position of the sample be changed relative to the reference mirror. This can be achieved by moving either the reference mirror 24 or the sample S. A piezo-electric transducer 40 is included in the profiler 10 to move the reference mirror 24. As the reference mirror is moved, the phase difference, and thus the intensity distribution across the interference pattern changes. The photosensing device 28 is used to detect the intensity across the image of the surface at the different reference mirror positions. In operation the mirror is moved to vary the phase of the beam reflected from the reference mirror 24 in one-quarter wavelength steps.

Various PMI algorithms may be implemented in the computing device 32 to compute the surface profile. Standard PMI is done at one wavelength. Using visible light the maximum measurable step height at a single wavelength has been approximately 1500 angstroms. Step height refers to the height difference between adjacent sampling points (i.e. points on the sample surface corresponding to the adjacent photodetectors in a photodetector array). By interchanging spectral filters to take measurements at several wavelengths, the maximum measurable step height may increase to approximately 200,000 angstroms.

Figure 2:
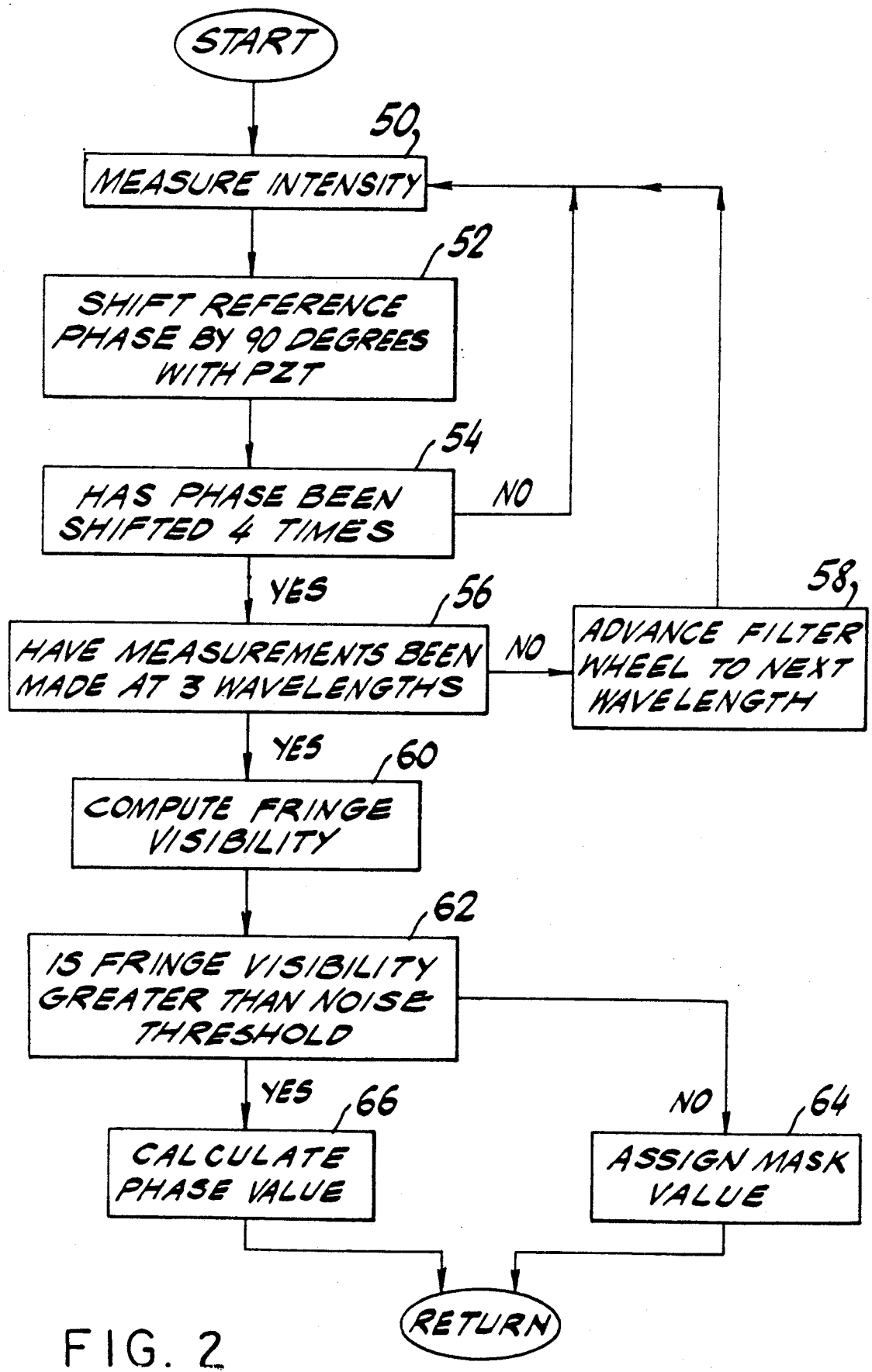
FIG. 2 is a flow chart of the phase measurement program of the computing device for the non-contact surface profiler.

Referring to FIG. 2, a flow chart of the phase measurement software is listed illustrating the operation of the profiler for multiwavelength phase measuring interferometry. At step 50, the light intensity across the photosensing device 28 is measured. At step 52, the reference mirror 24 is moved by the piezoelectric transducer to shift the phase of the reflected light by 90 degrees. At step 54, it is determined whether the phase has been shifted four times such that measurements have been made at phase shifts of 0, 90, 180, and 270. Once measurements are made at these four phases, step 56 is reached. At this point it is determined whether sets of the phase measurement have been made at 3 wavelengths. If not, step 58 is performed causing the filter wheel to be advanced. Once measurements are made for three wavelengths, data has been stored for the intensity distribution I(X,Y) incident at the photosensing device 28 at each wavelength and reference mirror position. This data is used in step 60 to calculate fringe visibility using the formula:

$$\gamma = \sqrt{\frac{(I_1 - I_3)^2 + (I_4 - I_2)^2}{I_1 + I_2 + I_3 + I_4}} \quad (1)$$

where
  $\gamma$ = fringe visibility
  $I_n$ = measured intensity at reference mirror position n.

In step 62 the fringe visibility is tested to see if it is greater than a predetermined noise threshold. If not, then a mask value is assigned in step 64. Otherwise the phase value is calculated.

Phase value is calculated at step 66 using the four sets of intensity measurements.

The phase at each detector point (x,y) and wavelength, $\lambda$, is:

$$\phi(x,y,\lambda) = \tan^{-1}[(I_4(x,y,\lambda) - I_2(x,y,\lambda))/(I_1(x,y,\lambda) - I_3(x,y,\lambda))] \quad (2)$$

If the sample is an opaque material with no transparent layers, phase value relates to the surface profile by the following equation:

$$\phi(x,y,\lambda) = \left[ \frac{4\pi d(x,y)}{\lambda} - 2\pi m(x,y,\lambda) \right] \quad (3)$$

where:
  d(x,y) is the surface profile; and
  m(x,y) is an integer describing the $2\pi$ ambiguity inherent in phase measuring interferometry.

The $2\pi$ ambiguity is resolved by making phase measurement at more than one wavelength. This is the technique of multi-wavelength PMI. If two wavelengths, $\lambda_1$ and $\lambda_2$ are used, $m_1(X,Y,\lambda)$ and $m_2(x,y,\lambda)$ are assumed to be equal. The two measured phase values are then subtracted to obtain $$\phi(x,y, \lambda_2) - \phi(x,y, \lambda_2) = 4\lambda d(x,y)(-1/\lambda_1 + 1/\lambda_2) \qquad (4)$$

Solving for the surface profile, we find $$d(x,y) = (\tfrac{1}{4}\pi)(\phi(x,y,\lambda_1) - \phi(x,y,\lambda_2))(\lambda_2\lambda_1/(\lambda_2 - \lambda_1)) \qquad (5)$$

However, we have magnified the error in the profile by the factor $\lambda/(\lambda_2 - \lambda_1)$. The precision of the single wavelength PMI is restored by substituting the profile obtained from Eq. 5 into Eq. 3 and using the knowledge that $m(x,y,\lambda)$ is an integer. Once $m(x,y,\lambda)$ is known, Eq. 3 is solved for $d(x,Y)$. This technique may be expanded to any number of wavelengths obtaining greater range and noise immunity advantages.

Figure 5:
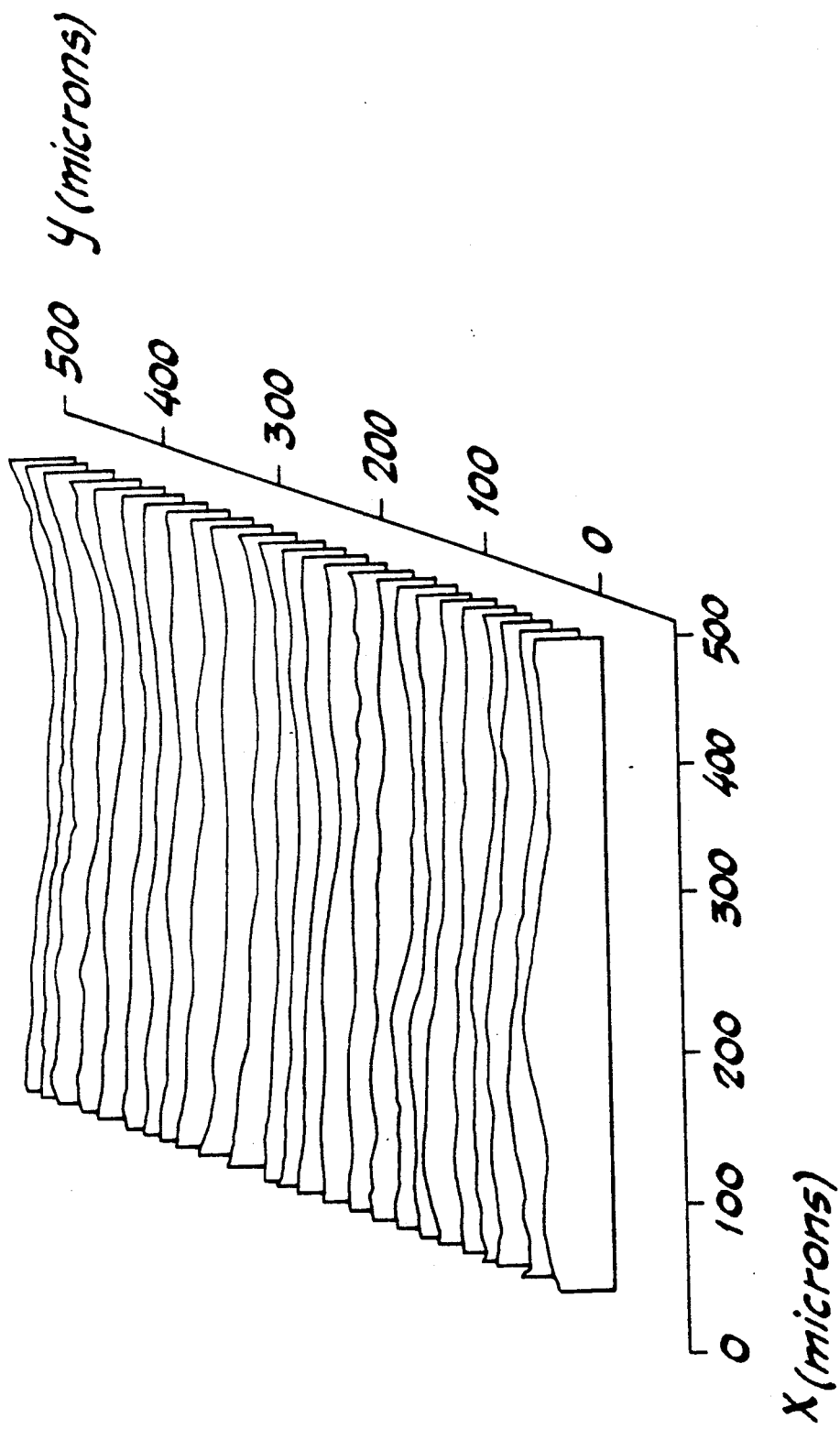
FIG. 5 is a sample surface profile of an opaque substrate.

FIG. 5 represents a surface profile formatted as a 3 dimensional plot for a portion of a sample opaque substrate.

If the sample contains a transparent layer over a light-absorbing or opaque material, then a phase correction factor which accounts for the presence of the transparent film is necessary to compute the surface profile.

The phase change upon reflection from a transparent film on an light absorbing substrate (e.g. $SiO_2$ on Silicon) can be calculated if the film thickness and optical constants of the film and substrate are known. The analysis can be found in M. Born & E. Wolf (1980) *Principles of Optics*. The equation for determining the phase change upon reflection $\delta_r$ is:

$$\tan(\delta_r) = \frac{\rho_{23}(1 - r_{12}^2)\sin(\phi_{23} + 2\beta)}{r_{12}(1 + \rho_{23}^2) + \rho_{23}(1 + r_{12}^2)\cos(\phi_{23} + 2\beta)} \qquad (6)$$

where $r_{23} = \rho_{23} e^{i\phi_{23}}$ is the reflectivity of the film-substrate boundary, $r_{12}$ is the reflectivity of the air-film boundary, and $\beta$ given by $$\beta = 2\pi n(\lambda) \, t/\lambda \qquad (7)$$

where n is the refractive index of the film and t is the film thickness.

In order to use this analysis to determine the phase change upon reflection the film thickness must be known. The film thickness is measured by shuttering the reference channel and using imaging spectrophotometry. Once the film thickness is determined the phase change upon reflection is calculated using equation 6 for every point along the profile.

The corrected phase $\Phi$ (X,Y) is given by $$\phi(x,y) = \phi(x,y) - \delta_r(x,y) \qquad (8)$$

where $\phi(x,y)$ is the phase determined by MWPMI and $\delta_r$ is the phase change upon reflection. The surface profile $d(x,y)$ is then determined by using $\Phi(x,y)$ in place of $\phi(x,y)$ in equation 5.

MEASURING FILM THICKNESS PROFILES

For applications where only the film thickness profile is desired Imaging Spectrophotometric Profiling (ISP) is used. ISP is done with the reference portion of the profiler 10 shuttered. Referring to FIG. 1, light emitted from the source 14 passes through a collimating lens 18 then through a filter 17 on filter wheel 16. The light passing through the filter 17 is incident upon the beamsplitter 20. Because the reference portion is shuttered, the light transmitted through the beamsplitter is not used.

Part of the light beam, however, is reflected by the beamsplitter 20 and focused by a sample objective lens 26 onto the sample S. For film thickness measurement, the sample is a transparent film F on a light-absorbing or opaque substrate. A portion of the light is reflected from the film surface and reflected back through the optical system. The other portion is refracted and transmitted through the film then reflected from the light-absorbing surface under the film back through the optical system. The reflected beams interfere and return through the sample objective lens 26, to the beamsplitter 20 and then pass through the imaging lens 30 and focus on the photosensing device 28. The photosensing device 28 measures the intensity profile of the reflected image incident upon its surface. From the intensity data a reflectance profile of the sample is calculated. To determine the thickness of the Film F, intensity data is measured at multiple wavelengths by the interchange of different filters.

Figure 3:
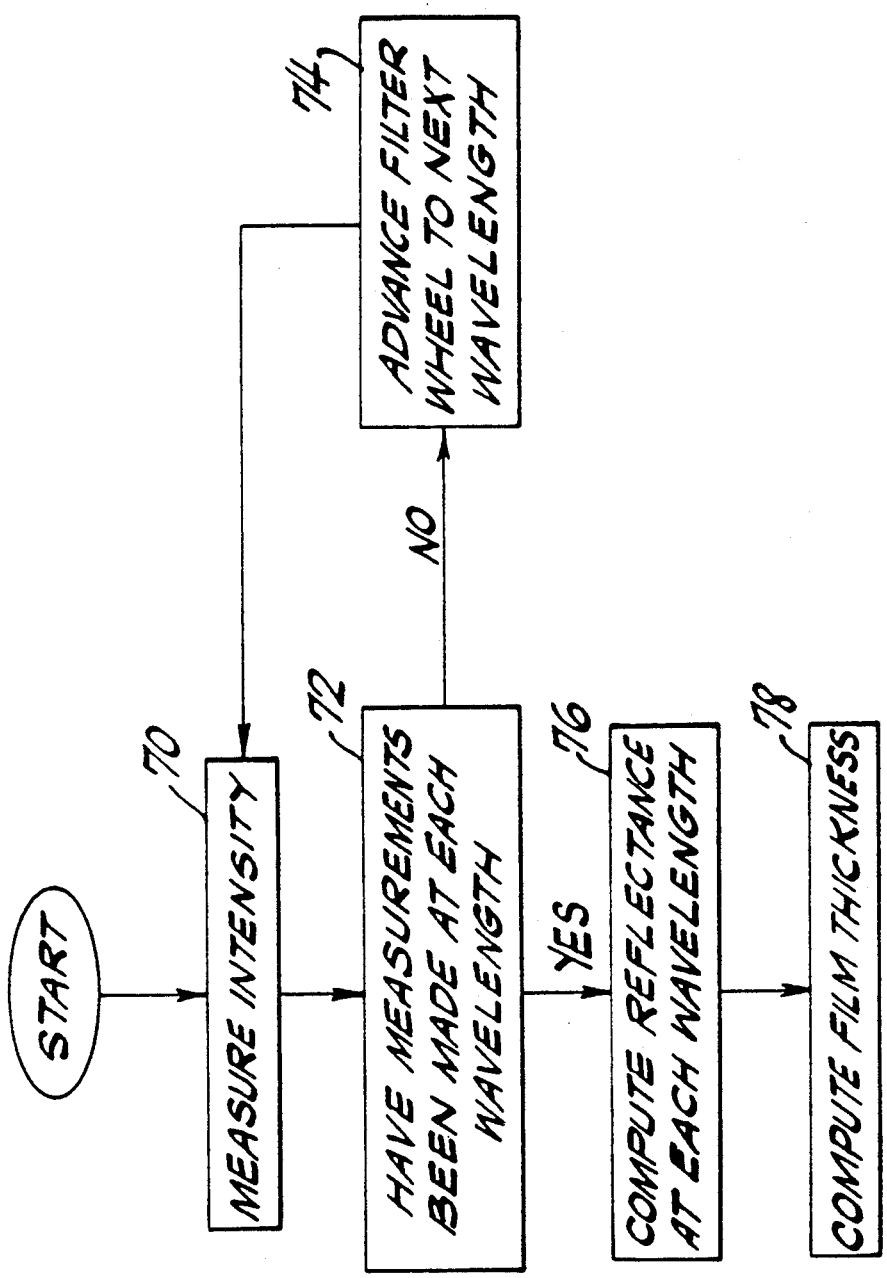
FIG. 3 is a flow chart of the film thickness measurement program of the computing device for the non-contact surface profiler.

Referring to FIG. 3, a flow chart of the film thickness measurement software is listed. At step 70, the light intensity across the photosensing device 28 is measured. At step 72, it is determined whether measurements have been made for a predetermined number of wavelengths. If not, step 74 is executed and the filter wheel 16 is rotated for passing light of a different wavelength. Once measurements have been taken for all wavelengths, step 76 is performed in which the reflectance at each wavelength is calculated. The following formula is used to calculate reflectance from the measured intensity taking into account detector gains and offsets:

$$R(x,y) = B \, I(x,y) + A \qquad (10)$$

where: A and B are constants for each wavelength and detector array location.

A is an intensity measurement with no sample in place at wavelength $\lambda$. B is determined experimentally by measuring the intensity of a sample having known reflectance at wavelength $\lambda$ and then solving for B.

The reflectance of a thin transparent film is given by $$R(\lambda, t) = \frac{r_{12}^2 + \rho_{23}^2 - 2r_{12}\rho_{23}\cos(2\beta - \phi_{23})}{1 - r_{12}^2\rho_{23}^2 - 2r_{12}\rho_{23}\cos(2\beta - \phi_{23})} \qquad (11)$$

(see Born and Wolf). $R(\lambda, t)$ is at a maximum or minimum value when $$2\beta + \phi_{23} = m\pi \qquad (12)$$

where $$\beta = 2\pi n t/\lambda \qquad (13)$$

and m is an integer. m decreases by 1 between each extrema as the wavelength is increased.

The film thickness is obtained from a set of reflectance values by applying a curve fitting algorithm to find the wavelengths where the reflectance extrema occur. These wavelengths are then used to solve Eq. 12 for the film thickness. For two adjacent extrema, the film thickness is given by:

$$t = \frac{\pi - \phi_{23a} - \phi_{23b}}{4\pi(n_a/\lambda_a - n_b/\lambda_b)} \qquad (14)$$

where the a and b subscripts refer to the first and second extrema wavelengths respectively with $\lambda_b$ greater than $\lambda_a$.

By applying the above method to each element in the photosensor array, a film thickness profile is obtained. If less than two extrema occur within the wavelength range examined, Eq. 12 cannot be solved for both m and t, and another algorithm must be used. A least squares fit of the measured reflectance to theoretical reflectance is an alternative algorithm.

Determining the Index of Refraction Of A Transparent Film

To determine the film thickness as discussed above, knowledge of the index of refraction of the film must be known. For some materials the index of refraction is well behaved varying little from standard values (e.g. silicon-dioxide). Thus a standard value may be used for the index of refraction. Other materials (e.g. silicon-nitride) have indices which vary widely for the same material under different conditions. For such materials with indices that vary widely, the following method may be used for determining the index of refraction.

Figure 4A:
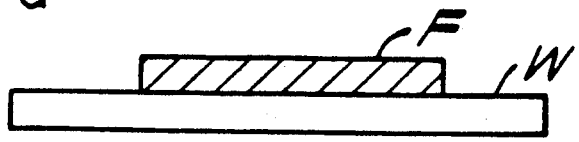
FIGS. 4a-4d illustrate alternative surface profile results for a light-absorbing material beneath a transparent film having an unknown index of refraction.
Figure 4B:
Figure 4C:
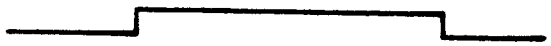
Figure 4D:

By using a test structure of (i) a transparent film having an unknown index of refraction on (ii) a light-absorbing or opaque substrate having a known surface geometry, the transparent film index may be determined with the non-contact surface profiler. The test structure requires only that there be a change in transparent film thickness over a region of known substrate geometry (see FIG. 4a). The test structure is then measured using the non-contact surface profiler assuming a typical index of refraction. If the substrate profile through the film shows a trench or a step (as in FIG. 4b and FIG. 4c) where the geometry should be flat the assumed index is incorrect. The correct index of refraction is determined by iteratively calculating the surface profile of the substrate through the transparent film with varying film indices of refraction until the substrate geometry measured through the transparent film matches the expected geometry (as in FIG. 4d).

While a preferred embodiment of the machine has been illustrated and described, the invention is not limited to the embodiment illustrated here. For example, there are numerous interferometric configurations (Linnik, Mireau, Michelson), many techniques for PMI (phase-stepping or integrating bucket), and different ways of achieving reference shuttering depending on the interferometer geometry (shuttering, defocussing the reference, averaging out the fringes, etc). The scope of the invention is intended to be determined by reference to the claims and their equivalents interpreted in light of prior art.

We claim:

1. An optical profiler for determining a surface profile from a transparent-film light-absorbing substrate combination in which the light-absorbing substrate is beneath the transparent film, comprising:
    a bi-configurable optical assembly which may be configured for performing interferometry in a first configuration and for performing spectrophotometry in a second configuration;
    the assembly comprising an adjustable wavelength light source for defining discrete wavelengths of illumination;
    means for establishing the first configuration wherein a dual beam interference pattern is obtained for each of a plurality of wavelengths;
    means for establishing the second configuration wherein a reflectance pattern is obtained for each of a plurality of wavelengths;
    photosensing means for measuring the intensity across each interference pattern and each reflectance pattern; and
    a computer for determining (i) the surface profile of the transparent film on the light-absorbing substrate, or (ii) the sub-surface profile of the light-absorbing substrate beneath the transparent film, or (iii) both said surface profiles, the surface profiles being determined from the intensity measurements across each interference pattern and each reflectance pattern.

2. The apparatus of claim 1, wherein a film thickness profile is calculated using the reflectance profiles obtained at multiple wavelengths.

3. An optical profiler for determining a surface profile from a transparent-film light-absorbing substrate combination in which the light-absorbing substrate is beneath the transparent film, comprising:
    an optical assembly for creating an interference pattern at each of a plurality of discrete wavelengths;
    an optical assembly for creating a reflectance pattern at each of a plurality of discrete wavelengths;
    an intensity measuring means for measuring the intensity at each point of an interference pattern and for measuring the intensity at each point of a reflectance pattern;
    a means for calculating phase value from the intensity measurements of the interference patterns using mutliwavelength phase-measured interferometry algorithms;
    a means for calculating a film thickness profile from the intensity measurements of the reflectance patterns;
    a means for calculating a phase correction factor from the film thickness profile; and
    a means for calculating a surface profile of the transparent-film light-absorbing substrate combination from the phase value, the phase correction, and the film thickness profile.

4. The apparatus of claim 3, further comprising a means for calculating a sub-surface profile of the light-absorbing substrate beneath the transparent film by subtracting the film thickness from the surface profile of the transparent-film light-absorbing substrate combination.

5. An optical profiler for determining a surface profile from a transparent-film light-absorbing substrate combination in which the light-absorbing substrate is beneath the transparent film, comprising:
    an optical assembly for creating an interference pattern at each of a plurality of discrete wavelengths;
    an intensity measuring means for measuring the intensity at each point of the interference pattern;
    a means for calculating phase value and fringe visibility from the intensity measurements; and
    a means for determining (i) the surface profile of the transparent film on the light-absorbing substrate, or (ii) the sub-surface profile of the light-absorbing substrate beneath the transparent film, or (iii) both said surface profiles, the surface profiles being determined from the intensity measurements across the interference patterns.

6. A method for determining surface profiles for a light-absorbing substrate beneath a transparent film using an optical assembly, a photosensing device and a computer, the optical assembly having an adjustable wavelength light source for defining discrete wavelengths of light, the method comprising the steps of:

creating an interference pattern at the photosensing device with the optical assembly for each of a plurality of illumination wavelengths;

calculating with the computer a phase value from the interference patterns using multiwavelength phase measured interferometry algorithms;

creating a reflectance pattern at the photodetecting device with the optical assembly for each of a plurality of beam wavelengths;

calculating with the computer the film thickness from the reflectance patterns;

calculating with the computer a phase correction to compensate for an error in the phase value due to refraction of the light beam by the transparent film, wherein the phase correction is calculated from the film thickness and the illumination wavelengths of each reflectance pattern; and calculating with the computer the surface profile of the transparent film on the light-absorbing substrate from the phase value, the film thickness, and the phase correction.

7. The method of claim 6, further comprising the step of:

calculating with the computer the surface profile of the light-absorbing substrate beneath the transparent film by subtracting the film thickness from the surface profile of the transparent film on the light-absorbing substrate.

8. A method for determining a film thickness profile of a transparent film on a light-absorbing substrate with an optical assembly, a photosensing device and a computer, wherein the optical assembly has an adjustable wavelength light source for defining discrete wavelengths of light, the method comprising the steps of:

illuminating the film with discrete illumination wavelengths, a portion of which is reflected back from the film surface and another portion of which is reflected back from the light-absorbing substrate, thereby creating a film interference pattern between the wavelengths reflected from the light-absorbing substrate;

creating an image of the film interference pattern at the photosensing device with the optical assembly for each of multiple illumination wavelengths;

inputting to the computer intensity data representative of the the image at the photosensing device; and calculating the film thickness profile with the computer using the intensity data.

9. The method of claim 8, wherein the step of calculating the film thickness profile is by calculating reflectivity from the intensity data and calculating the film thickness profile from the reflectivity.

10. A method for determining the index of refraction of a transparent film on a light-absorbing substrate of known surface geometry using an optical assembly for producing a beam of light, a photosensing array, and a computer for measuring the surface profile of the light-absorbing substrate, the method comprising the steps of:

determining the surface profile of the light-absorbing substrate beneath the transparent film using an assumed index of refraction of the transparent film;

comparing the calculated surface profile of the light-absorbing substrate to the known surface geometry of the light-absorbing substrate; and varying the assumed index of refraction of the transparent film and recalculating substrate until the calculated surface profile is the same as the known surface geometry;

wherein the unknown index of refraction is the determined index of refraction at which the calculated surface profile equals the known surface geometry.

11. An optical profiler using imaging spectrophotometry to determine a thickness profile of a transparent film, comprising:

an optical assembly for illuminating the film, said assembly having a light source and a plurality of interchangeable filters, each filter defining a discrete wavelength of the illumination, such that said assembly may illuminate the film with a discrete illumination wavelength creating an interference pattern at the film;

photosensing means, responsive to said optical assembly, for receiving from said assembly an image of the film interference pattern for multiple illumination wavelengths and for measuring an intensity profile representative of the image of the film interference pattern; and a computer for receiving the intensity profile from the photosensing means and calculating the film thickness over the area of the film.

* * * * *

UNITED STATES PATENT AND TRADEMARK OFFICE
CERTIFICATE OF CORRECTION

PATENT NO. : 5,042,949

DATED : Aug. 27, 1991

INVENTOR(S) : James M. Young, Jeffrey S. Greenberg, Jay E. Robinson, and Daniel A. Cohen It is certified that error appears in the above-identified patent and that said Letters Patent is hereby corrected as shown below:

ON THE TITLE PAGE:
Under item [19], please delete "Greenberg et al." and substitute therefor -- Young et al.--;

At item [76], please delete "Jeffrey S. Greenberg, 5 Miramar Ave., Santa Barbara, Calif. 93108; Jay E. Robinson, 1545 Kendall Dr., Boulder, Colo. 80303; James M. Young, P.O. Box 40449, Santa Barbara, Calif. 93140; Daniel A. Cohen, 309-B Consuelo Dr., Santa Barbara, Calif. 93110", and substitute therefor -- James M. Young, P.O. Box 40449, Santa Barbara, Calif. 93140; Jeffrey S. Greenberg, 5 Miramar Ave., Santa Barbara, Calif. 93108; Jay E. Robinson, 1545 Kendall Dr., Boulder, Colo. 80303; Daniel A. Cohen, 309-B Consuelo Dr., Santa Barbara, Calif. 93110 --.

At column 9, line 44, immediately following the phrase, "wavelengths reflected from the", please add -- film and the wavelengths reflected from the --.

At column 10, line 2, please delete the second occurrence of "the".

UNITED STATES PATENT AND TRADEMARK OFFICE
CERTIFICATE OF CORRECTION

PATENT NO. : 5,042,949

DATED : Aug. 27, 1991

INVENTOR(S) : James M. Young, Jeffrey S. Greenberg, Jay E. Robinson, and Daniel A. Cohen It is certified that error appears in the above-identified patent and that said Letters Patent is hereby corrected as shown below:

At column 10, line 23, immediately following "recalculating", please add -- the surface profile of the light-absorbing--.

Signed and Sealed this

Twenty-first Day of January, 1992

*Attest:*

HARRY F. MANBECK, JR.

*Attesting Officer*      *Commissioner of Patents and Trademarks*